United States Patent [19]

Spear

[11] 4,160,687

[45] Jul. 10, 1979

[54] MAGAZINE PAGE LABELING APPARATUS

[75] Inventor: Phillip L. Spear, Santa Ana, Calif.

[73] Assignee: Avery International Corporation, San Marino, Calif.

[21] Appl. No.: 918,728

[22] Filed: Jun. 26, 1978

[51] Int. Cl.[2] .......... B32B 3/24

[52] U.S. Cl. .......... 156/444; 156/216; 156/364; 156/479; 156/487

[58] Field of Search .......... 156/487, 486, 475, 477 R, 156/477 B, 492-493, 488, 216, 212, DIG. 38, DIG. 42, 362-363, 364, 444, 478-479

[56] References Cited

U.S. PATENT DOCUMENTS

| | | | |
|---|---|---|---|
| 1,732,908 | 10/1929 | Murphy | 156/486 X |
| 1,938,654 | 12/1933 | Braren | 156/477 R X |
| 2,056,451 | 10/1936 | Haberstump | 156/487 X |
| 2,064,658 | 12/1936 | Grieb et al. | 156/486 |
| 2,087,472 | 7/1937 | Dyment | 156/487 X |
| 2,388,770 | 11/1945 | Stein | 156/477 R X |
| 2,667,909 | 2/1954 | Stobb | 156/479 X |
| 2,854,164 | 9/1958 | Triolo | 156/477 R |
| 4,004,962 | 1/1977 | Klein | 156/477 R X |

*Primary Examiner*—David A. Simmons
*Attorney, Agent, or Firm*—Poms, Smith, Lande & Rose

[57] ABSTRACT

An apparatus for applying labels across the pages of a magazine as it is being conveyed with the binding of the magazine first, includes a label dispenser for applying a label to the trailing edge of the magazine with only a portion of the label being secured to the cover of the magazine. A high speed brush is then actuated to brush the rearwardly extending portion of the label down across the open pages of the magazine. A jet of air then swings the label forward over the other cover of the magazine, and the final operation utilizes an additional brush to secure the end of the label in place over the edge of the other cover of the magazine, so that the label extends from one cover across the open pages and onto the other cover of the magazine.

8 Claims, 6 Drawing Figures

MAGAZINE PAGE LABELING APPARATUS

FIELD OF THE INVENTION

The present invention relates to an apparatus for applying labels or other self-adhesive material to three sides of an object, including the rear side of an object which is moving past the labeling apparatus.

BACKGROUND OF THE INVENTION

Labels are frequently applied to three sides of a package or other object, and this is conventionally done by moving the package or other object to be labeled into a label to initially engage the label on the central one of the three sides, and then rolling the label back along the other two outer sides. However, a more difficult task is presented when it is necessary to apply the label to the rear of a rapidly moving object. Heretofore, labels have occasionally been applied to the rear of an object or package by rolling the label over the rear of the box or package, after initially applying it to the side; and this has proved satisfactory for two-sided labels, particularly when the objects are not moving at high speeds.

It has also been proposed to apply labels over the pages of magazines, but this has not, up to the present been done on a systematic basis while the magazines are coming from the final trimming operation at high speeds.

In the printing of magazines, the final step involves the conveying of the magazine in its bound form away from the trimming operation at relatively high speeds in the order of 200 feet per minute, with the binding first, and the pages of the magazines to the rear. When the publishers of magazines sought to have labels applied across the pages, a number of label apparatus manufacturers proposed systems which would involve turning the magazines around so that the open pages would be first, and the bindings trailing as the magazines were conveyed through the labeling step. However, this additional step of turning the magazine in order to facilitate more conventional labeling techniques proved to be quite costly, with the apparatus required for accurately rotating the magazines being equal in cost or more expensive than the labeling apparatus, and requiring expensive conveyor line space in order to accomplish the rotation.

Accordingly, a principal object of the present invention is to apply labels across the trailing edge of magazines traveling down a conveyor line in a simple and inexpensive manner, and without taking up unnecessary conveyor line space.

SUMMARY OF THE INVENTION

In accordance with a preferred apparatus of the invention, as the magazines are being conveyed past the apparatus at high speeds, with the binding first and the loose pages trailing, a label is initially dispensed to stick to the rear edge of one cover of the magazine and extending outwardly beyond the rear of the magazine. Then a brush sweeps down to deflect the label across the pages of the magazine, and an air jet directed in the direction of travel of the magazines blows the label forward and finally an additional brush swings forward at high speed to firmly apply the label to the lower cover of the magazine, thus completely securing the label from one cover across the loose pages to the other cover of the magazine, all while the magazine is traveling forward at high speed.

In accordance with other aspects of the invention, the same apparatus as described in the preceding paragraph may be employed to apply labels to the sides and the rear surface of objects other than magazines which are moving along a conveyor at high speeds; the pneumatic blower may be substituted for one of the brushes, or alternatively the pneumatic blower may be eliminated, in certain circumstances depending on the geometry and the speed of the conveyor line; and suitable photocells or microswitches may be employed to start and stop the operation of the label dispenser and the brushes at the proper times.

Other features which may be included in the apparatus include the use of pivotal brushes with spaced sets of extending brush tufts, and arrangements for orienting the brushes so that the tufts are out of the path of the label, except when the brushes are actuated; wherein the label applicator includes a roller and arrangements for dispensing labels at approximately the speed of the conveyor belt; and photocells actuated both by the trailing edge of the magazine and by the rotation of said brushes to control the applicator, the upper brush, and the lower brush operation, all of which are accurately timed and synchronized with one another.

Other objects, features, and advantages of the invention will become apparent from a consideration of the following detailed description and from the accompanying drawings.

DETAILED DESCRIPTION

Figure 1:
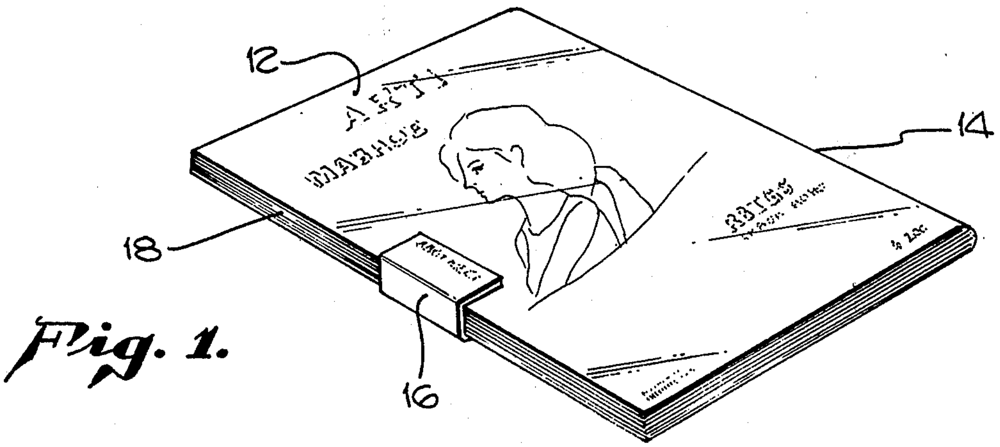
FIG. 1 shows a magazine with a self-adhesive label extending from one cover across the pages to the other cover of the magazine.

Referring more particularly to the drawings, FIG. 1 shows a magazine 12 having a bound side 14 and a label 16 restricting access to the other side 18 of the magazine. The use of such a label 16 is often considered desirable when the magazine is not to be perused, until after purchase.

Figure 2:
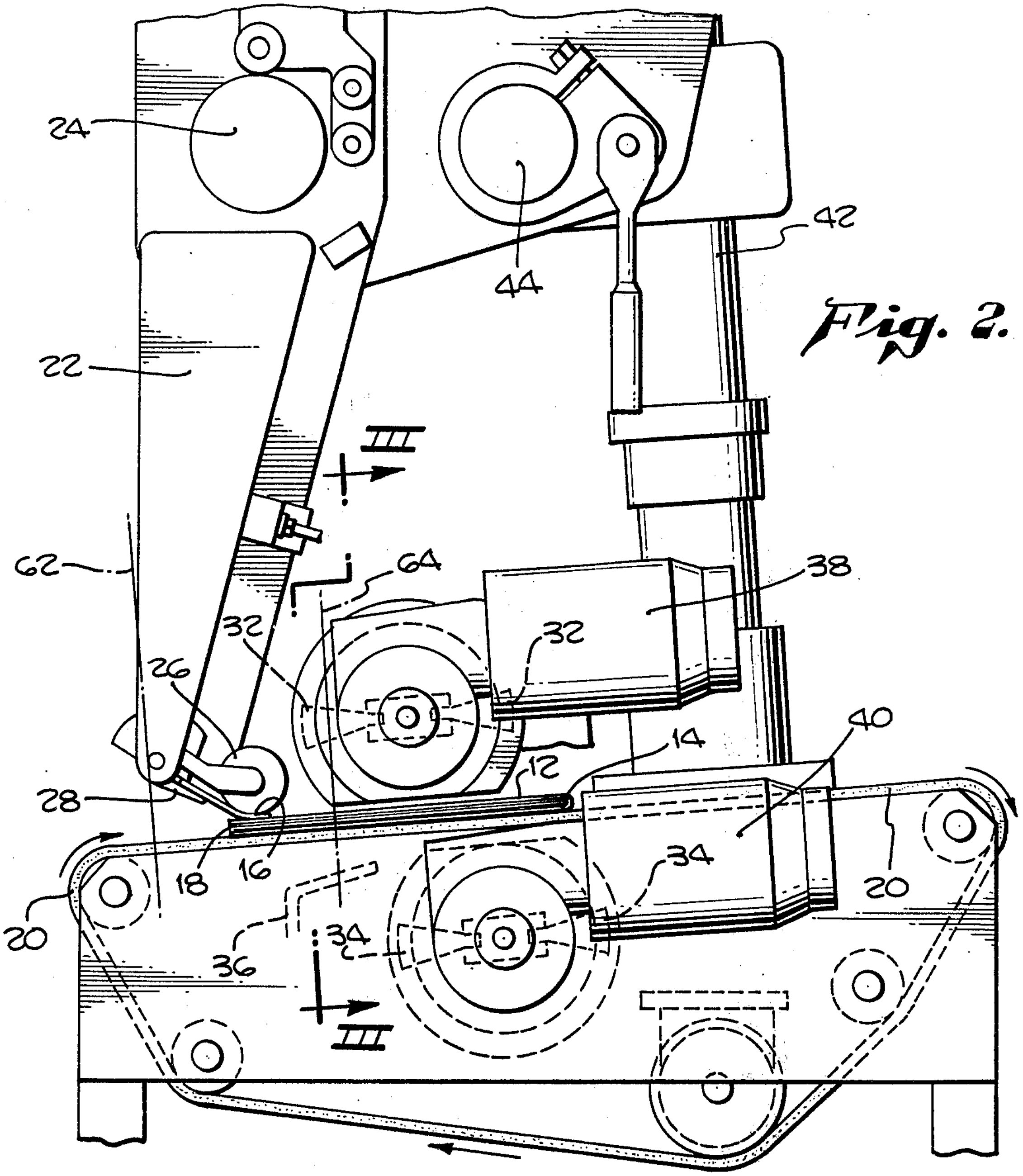
FIG. 2 is a side view of a label-applying apparatus illustrating the principles of the present invention.

In FIG. 2 the magazine 12 is being conveyed from left to right, on the conveyor belting 20, with the bound edge 14 of the magazine 12 leading. The label applicator unit 22 includes a reel 24 carrying a roll of backing paper on which the labels are spaced, an applicator roller 26 and the peeling blade 28 from which the label 16 is dispensed. When the backing paper is drawn sharply over the edge of the peeling blade 28, the label 16 continues forward and is firmly applied by the roller 26 to the trailing edge of the magazine 12 as shown in FIG. 2. Also shown in FIG. 2 are the upper brushes 32 and the lower brushes 34. These brushes operate to secure the label 16 in position as shown in FIG. 1, as will be described in connection with other figures of the drawings. Air is supplied under pressure through the pneumatic tube 36 to help position the label prior to the final securing step, as disclosed below.

For completeness, it may be noted that the motors 38 and 40 are the drive motors for the brushes 32 and 34, respectively. In addition, the vertical supporting column 42 and the horizontal support 44 are provided to give full flexibility in mounting the applicator 22 in the desired vertical position and at the desired orientation for properly dispensing labels.

It may also be noted that the applicator 22 is a standard applicator which is known as the "500 Labeling Head" available from Avery Label Systems Division, 777 E. Foothill Blvd., Azusa, Calif. 91702. The labeling head 22 is provided with a tachometer to sense the speed of the conveyor belt 20 and dispense labels at a speed substantially equal to the speed of movement of the product, such as magazine 12 on the conveyor belt.

Figure 3:
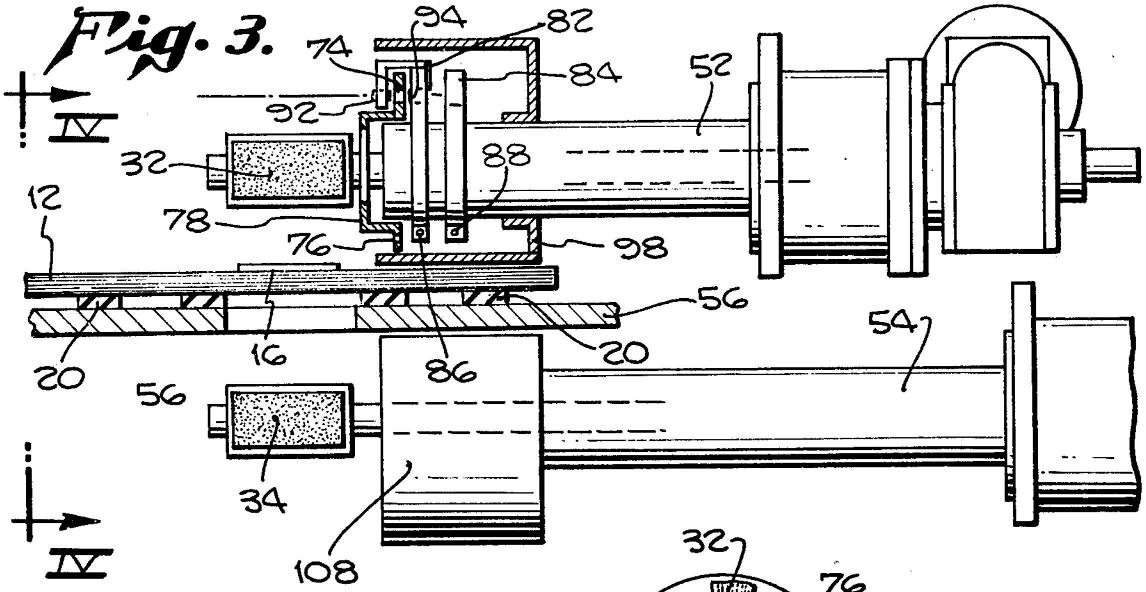
FIG. 3 is a front view of a portion of the apparatus of FIG. 2 taken along lines III—III thereof.

FIG. 3 is a partial cross-sectional view taken along lines III—III of FIG. 2. FIG. 3 clearly shows the upper brush 32 and the lower brush 34, the magazine 12, and the label 16 which has been tacked on to the rear edge of the upper cover of the magazine 12 but which has not yet been wrapped around the pages. Also shown in FIG. 3 are the supports 52 and 54 for the drive shafts for the brushes 32 and 34, respectively. The conveyor belting 20 and the underlying supporting table 56 are also clearly shown in FIG. 3.

Figure 4:
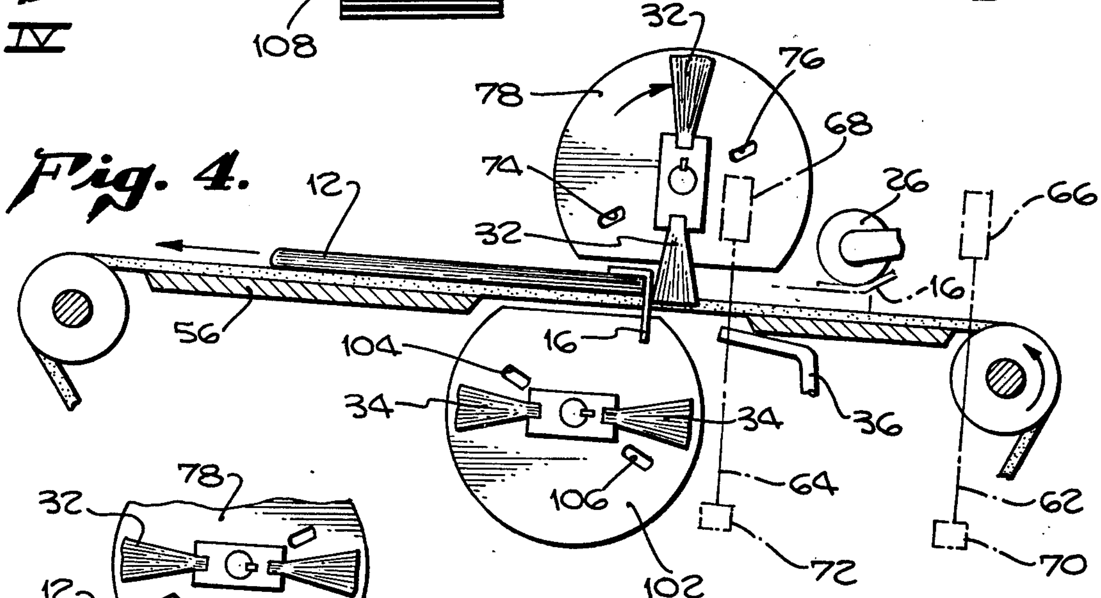
FIG. 4 is a partial cross-sectional view showing the mode of operation of the brushes and taken along lines IV—IV of FIG. 3.

The operation of the applicator 22, and the brushes 32 and 34, are controlled by photocells. More specifically, there are five photocells employed in the control of the applicator and of the two brushes. With reference to FIG. 2, the vertical dash-dot lines 62 and 64 indicate the approximate position of the sensing paths of the first two photocells which are active. These same two dash lines 62 and 64 are also shown in FIG. 4, in which the movement of the magazine 12 is reversed, as it moves from left to right rather than in the opposite direction as shown in FIG. 2. The sources of collimated light 66 and 68 impinge on the semi-conductor photo detector units 70 and 72, respectively, located below the table 56 and sense the instant at which the magazine 12 passes the lines 62 and 64, thus permitting the collimated beams of light to impinge on the corresponding photo detectors. The photocell and light source combinations are fully adjustable in the forward and back directions so that the precise timing of the applicator and the initiation of the action of the brush 32 may be obtained.

It may be noted that the Avery 500 Labeling Head, identified above, employes Bodine motors and Eaton clutch brakes, and it was determined that the same motors and clutch brakes could advantageously be employed to drive the brushes 32 and 34, in view of the proven reliability of this type of combination for start-stop operations of the type under consideration.

As mentioned above, there are five photocells employed to control the applicator and the two brushes. More specifically, the photocell and light source 66,70 operates the applicator to dispense the label 16; and the energization of the photocell light source combination 68,72 serves to initiate action of the brushes 32, as indicated in FIG. 4, when the trailing edge of the magazine passes the dash-dot line 64. When not in operation the brushes 32 and 34 are normally located out of the path of the magazine as indicated in FIG. 2. Slight shifts of the rest position from the horizontal may in some cases provide improved results. Following deflecting of the label down as indicated in FIG. 4, the rotation of the brushes 32 continue, but only for precisely 180 degrees, so that the other brush performs the deflecting operation on the next magazine. Thus, in the course of each labeling operation, each of the brush assemblies 32 and 34 perform a movement of only 180 degrees.

As mentioned above, the photocells 70 and 72 start the applicator, and start the operation of the upper brush 32, respectively. Two additional photocell assemblies are associated with the upper brush assembly 32 and are operated when the apertures 74 and 76 in plate 78, which rotates with the brushes 32, permit illumination to fall on the photocells. As indicated in FIG. 3, the plate 78 is dished or bent so that the outwardly extending portion thereof, which has the apertures 74 and 76, is offset from the brushes 32. Two photocell assemblies 82 and 84 are mounted on the fixed shaft 52 and may be adjustably positioned by loosening the screws 86 and 88 on the clamping bracket, which encircle the shaft 52, and rotating the photocell assemblies 82 and 84 and then securing them firmly in place once more by tightening the screws 86,88. The fixed photocell assembly 82 includes a diode pickup 92 and a source of light 94. When the opening 74 rotates to permit energization of the photodiode 92 from the light source 94, a suitable control signal stops the rotation of the brushes 32. With the particular motors and electronics which are employed, the brush assembly moves about five degrees after the receipt of the "stop" signal from the photodiode 92. The other photo pickup assembly 84 also extends over the plate 78, but at a different angular orientation, and provides signals to initiate operation of the lower brushes 34. Incidentally a cylindrical cover 98 may advantageously be employed to protect the photodiode assemblies 82 and 84, and to protect them from dirt or mechanical injury.

Rotating with the lower brushes 34 is a plate 102 which is provided with two apertures 104 and 106. A single photocell assembly is provided to stop the brushes 34, after the lower brush assembly has rotated by 180 degrees. The diametrically opposed slots 104 and 106 are provided so that on alternate cycles one or the other of these apertures is effective. The housing 108 as shown in FIG. 3 encloses the disc 102 and the single photocell unit, which is not separately shown but which is fully adjustable in the manner of the photocell assemblies 82 and 84, shown in FIG. 3.

Figure 5:
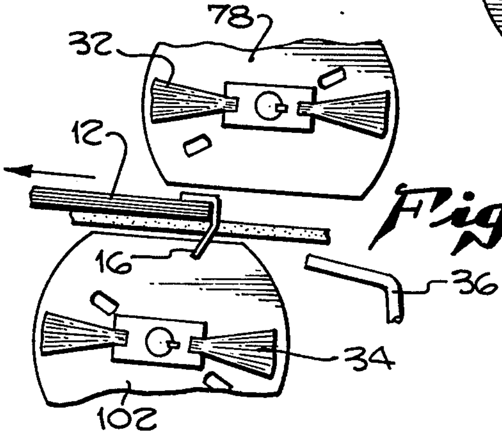
FIG. 5 is a view showing the operation of the pneumatic blower in deflecting the label around the lower cover of the magazine.
Figure 6:
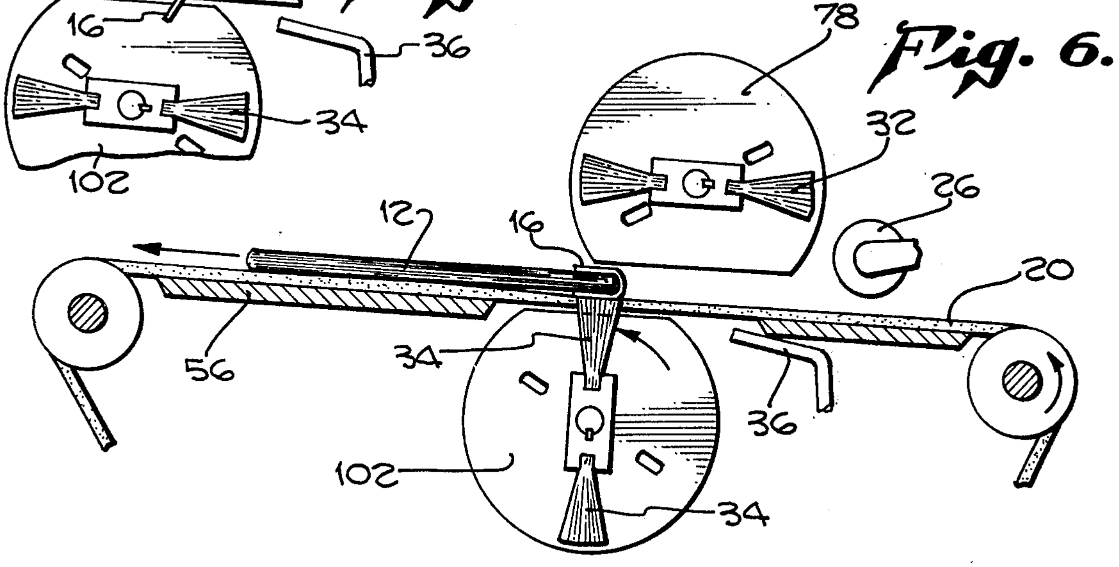
FIG. 6 shows the completion of the application of the label to the rear of the magazine, and extending from one cover across the open pages to the other cover of the magazine.

FIG. 5 shows the action of the air stream from the pneumatic tube 36, which deflects the lower end of the label 16 over the bottom cover of the magazine 12. As shown in FIG. 6, the final step in the operation is the firm completion of the application of the label across the edge of the lower cover by the action of one of the lower brushes 34.

In closing, it is to be understood that the above-described preferred embodiment is merely illustrative of the principles of the invention. Thus, by way of example and not of limitation, minor modifications in the arrangement could include (1) the use of an air blast directed downwardly to accomplish the function of the brushes 32, (2) the substitution of other high speed wiping arrangements for the brushes 32 and 34, and (3) the use of microswitches or cam operated switches in place of the disclosed photocells. Accordingly, the present invention is not to be limited to the specific preferred embodiment shown in the drawings.

What is claimed is:

1. An apparatus for applying self-adhesive labels over the pages of magazines to hold the pages closed, as the magazines are moving along a conveyor line with the binding leading and the open pages trailing, comprising:

means for dispensing a label and applying it onto the back edge of one cover of said magazine to extend over the rear edge of said magazine;

means for brushing said label down across the pages of said magazine;

means for directing a jet of air in the direction of travel of said magazines to deflect said label forward over the lower cover of said magazine; and means for brushing said label forward in the direction of movement of said magazines and for firmly applying said label to the lower cover of said magazine, whereby said label extends from the top cover over the normally exposed cut pages of said magazine and into engagement with the lower cover, so that the magazine may not easily be perused without destroying the label.

2. An apparatus as defined in claim 1 wherein each said brushing means includes extended bristles; and further comprising means for operating said brushes at high speed to engage said label; and means for maintaining said bristles out of the path of said label except when the brush means are operated.

3. An apparatus as defined in claim 1 further comprising photocell means for controlling the timing of the operation of said dispensing means and each of said brush means.

4. An apparatus as defined in claim 1 wherein each of said brushing means includes pivotally mounted brush assemblies with spaced sets of brush tufts extending outwardly from the pivot point of said brush assembly.

5. An apparatus as defined in claim 1 wherein said dispensing means includes a roller and means for dispensing and applying labels at approximately the speed that said magazines are moving along said conveyor line.

6. An apparatus as defined in claim 1 further comprising:

first photocell means for sensing the position of said magazine for initiating operation of said label dispensing and applying means;

second photocell means for sensing the position of said magazine and initiating operation of said first brushing means;

means for sensing the orientation of the first brushing means and for initiating operation of the second brushing means.

7. An apparatus as defined in claim 6 further comprising means for stopping said brushing means in two predetermined angular orientations.

8. An apparatus for applying labels over the rear and the two sides of a high speed moving object comprising:

means for dispensing a label and sticking it onto the back edge of one side of said object to extend beyond the rear of said object;

means for brushing said label across the rear of said object;

means for directing a jet of air in the direction of travel of said objects to deflect said label forward over the other side of said object; and means for brushing said label forward in the direction of movement of said object and for firmly applying said label to the other side of said object.

* * * * *